Nov. 5, 1929.   C. OFFENHAUSER   1,734,824
METHOD OF AND APPARATUS FOR TREATING MATERIAL
Filed Dec. 8, 1926   3 Sheets-Sheet 2

Inventor
Christopher Offenhauser
By Herbert P. Fairbanks
Attorney

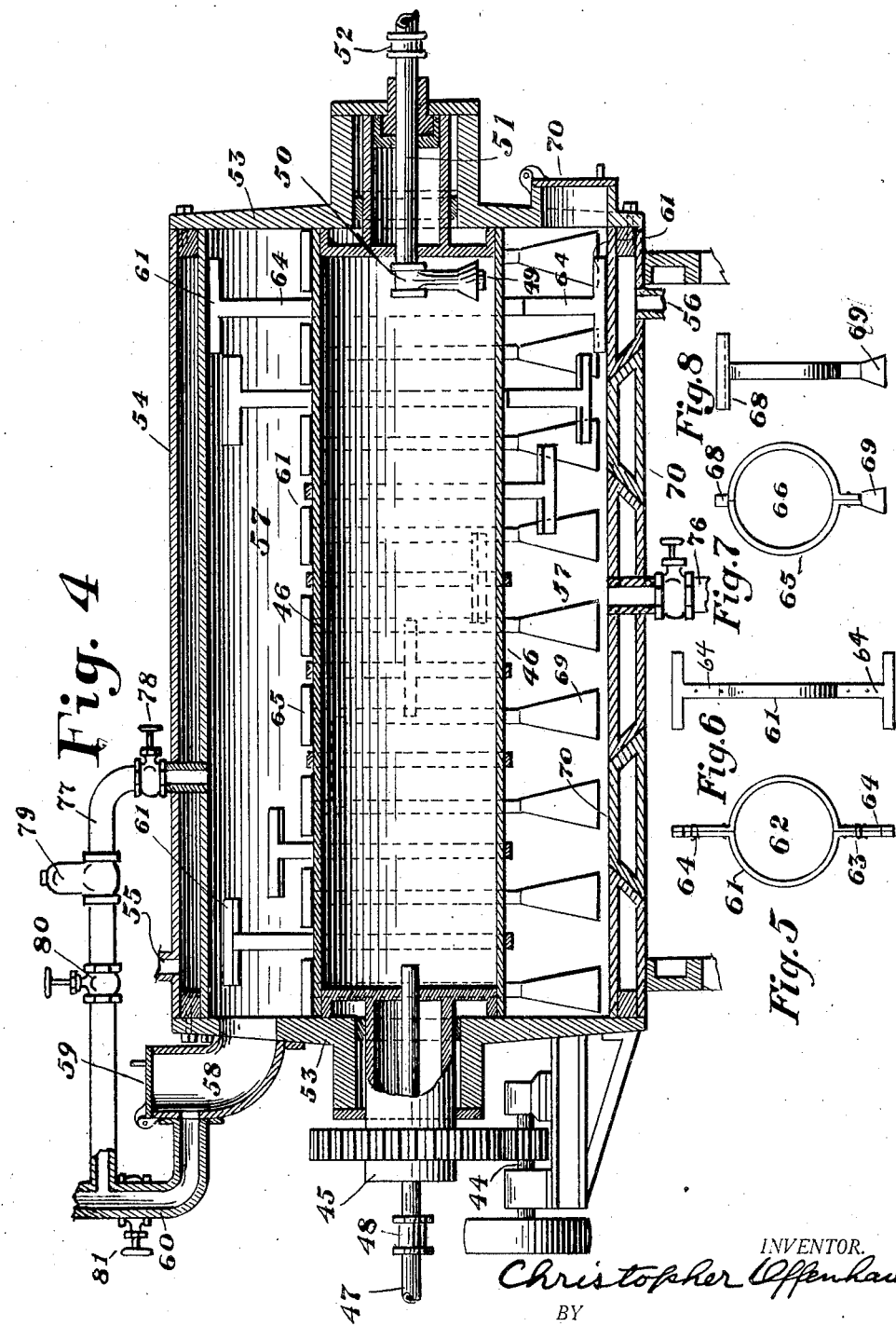

Patented Nov. 5, 1929

1,734,824

UNITED STATES PATENT OFFICE

CHRISTOPHER OFFENHAUSER, OF PHILADELPHIA, PENNSYLVANIA

METHOD OF AND APPARATUS FOR TREATING MATERIAL

Application filed December 8, 1926. Serial No. 153,298.

The object of this invention is to devise a novel method of and a novel apparatus for treating material, and relates more particularly to a novel method of and apparatus for cooking and drying meat products.

The further object of my invention is to devise a novel cooking and drying apparatus in which provision is made for agitating the material and at the same time effecting a scraping action on the inner and outer walls of the drying chamber in order to prevent the accumulation of the material being treated thereon, and thereby the insulation of such walls from the action of the heat.

With the above and other objects in view as will hereinafter more clearly appear, my invention comprehends a novel method of and apparatus for treating material.

It further comprehends a novel cooking and drying apparatus wherein novel means are provided to prevent the accumulation of the material being treated on the walls of the drying chamber, and whereby I am enabled to subject the material to the uniform action of the heating medium.

It further comprehends a novel method of treating material wherein the material to be treated is subjected to the action of steam in a closed chamber, the steam being under a desired pressure and continuing for a definite or predetermined length of time. Thereafter the introduction of steam into the material being treated is discontinued and the material is subjected for a desired period of time to the action of the steam, which radiates through the walls of the chamber and during this period the walls of the chamber are subjected to a scraping action and the material is subjected to a mixing or commingling action due to the provision of these scraping members.

It further comprehends a novel cooking and drying apparatus wherein a drying chamber is formed between an outer stationary drum and an inner revolving drum, into which latter, the steam is introduced, and the drying chamber is provided with a novel construction and arrangement of scrapers which prevent the accumulation of material being treated on such walls.

Other novel features of construction and advantage will hereinafter more clearly appear in the detailed description and the appended claims.

For the purpose of illustrating my invention, I have shown in the accompanying drawings, typical embodiments of it, which in practice, will give reliable and satisfactory results. It is, however, to be understood that these embodiments are typical only and that the various instrumentalities of which my invention consists can be variously arranged and organized, and that the invention is not, therefore, limited to the precise arrangement and organization of these instrumentalities as herein set forth.

Figure 4 is a longitudinal section of another embodiment of my invention.

Figure 5 is an end elevation of a scraping blade for the outer drum, seen in Figure 4.

Figure 6 is a side elevation of the scraping blades seen in Figure 5.

Figure 7 is an end elevation of the scraping blade on the rotatable drum.

Figure 8 is a side elevation of the blade seen in Figure 7.

Similar numerals of reference indicate corresponding parts.

Referring to the drawings:—

Figure 1:
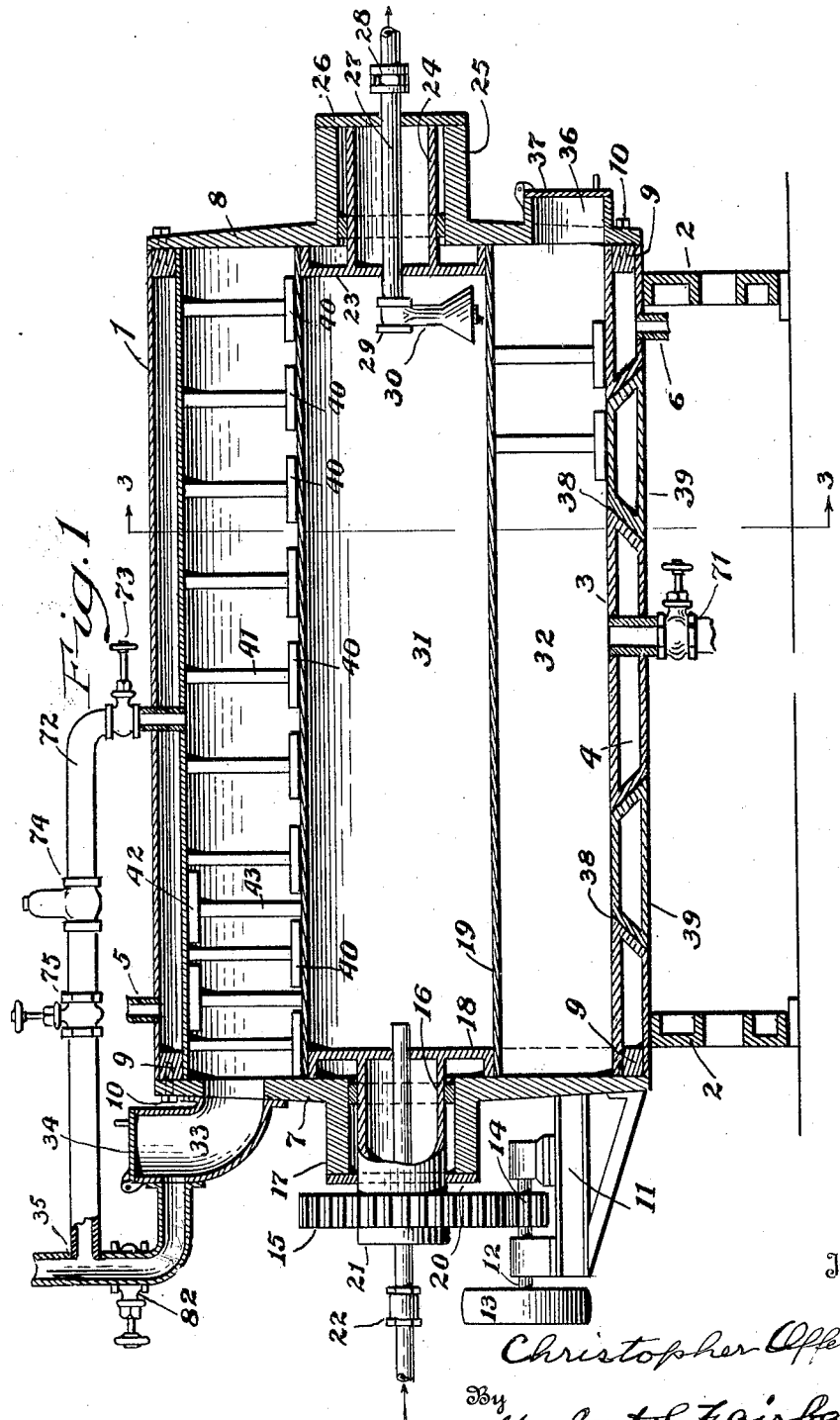
Figure 1 is a longitudinal section of a cooking and drying apparatus embodying my invention.

1 designates a cooking and drying apparatus embodying my invention.

The apparatus is supported on a suitable foundation, such as for example, the standards 2 which have their upper supporting surfaces curved to receive the stationary drum 3, which is provided with a steam jacket 4, to which steam is admitted through the intake pipe 5, and from which the steam is discharged through the discharge pipe 6.

The drum 3 has fixed to it the end members 7 and 8, respectively, in any desired manner.

As illustrated, these end plates are bolted to the spacing rings 9 by means of fastening devices 10. The head 7 has fixed to it in any desired manner a bracket 11, in which is journalled a driving shaft 12 provided with a pulley 13, thereby adapting it to be driven by any desired source of power.

The shaft 12 has fixed to it a gear 14, which meshes with a gear 15 which is fixed to a sleeve 16, journalled in the hub 17 of the end member 7. The sleeve 16, at its inner end, is provided with a flanged disc 18 which is welded or riveted in the revolving drum 19.

The hub 17 has fixed to it an end plate 20, which is apertured to receive a steam pipe 21, provided with a rotatable union 22, and having its inner end discharged within the drum 19. The opposite end of the drum is closed by means of a flange disc 23 which is riveted or welded to the drum and which is provided with a sleeve 24 having a bearing in the hub 25 of the end plate 8.

26 is an end plate secured to the hub 25, and apertured to receive an exhaust pipe 27, which is provided with a rotatable union 28 exterior of the casing, and it is also provided with a rotatable union 29 within the drum 19, so that its inner weighted end which extends downwardly as at 30 will always be retained in the position shown in Figure 1, so that the water of condensation will be removed, it being noted that the lower end of the portion 30 terminates in close proximity to the bottom of the steam chamber 31 in the revolving drum 19.

The stationary drum 3 and the revolving drum 19 form between them the cooking and drying chamber 32, into which the material to be treated is inserted through the filling conduit 33, which is provided with a closure 34, and this filling conduit communicates with a conduit 35 which leads to a vacuum pump (not shown).

The chamber 32 is provided with a discharge outlet 36 which is controlled by means of a gate 37, and the stationary drum is also provided with a desired number of discharge outlets 38 which are controlled by gates 39, which may be of any desired construction.

The stationary drum has fixed to it, at its upper end, as shown in Figure 1, a plurality of spaced scraping blades 40 the stems 41 of which are riveted, bolted or welded to the stationary drum 3.

The scraping blades 40 are in close proximity to the outer wall of the revolving drum 19, so that material being treated is prevented from accumulating on the outer wall of the revolving drum at such points. The revolving drum carries the scraping blades 42 which travel in close proximity to the inner wall of the stationary drum 3 and are provided with stems 43 which are riveted, welded or otherwise secured to the revolving drum 19. These scraping blades 42 are arranged to travel between a pair of scraping blades 40.

It will thus be seen that substantially the entire inner and outer walls of the drying chamber are subjected to the action of scraping members which prevent the accumulating of the material being treated at such places.

In devices of this character as ordinarily constructed, the material being treated cakes on the walls of the heating chamber and acts as a heat insulator, so that the material being treated becomes very hard in proximity to the heating surface, but is not sufficiently cooked and dried at the central portion of the heating chambers.

In accordance with this invention, the outer surface of the insulating drum and the inner surface of the stationary drum are subjected to a scraping action which prevents the accumulation of the material being treated on such surface and the blades also serve to break up and mix the material.

The scraping blades carried by the revolving drum 19 are arranged in staggered relation around the periphery of such drum.

In order to make provision for the introduction into material being treated of steam or other desired fluid medium, I provide a valve controlled steam conduit 71, which communicates with the chamber 32, and from this chamber leads a conduit 72, having a controlling valve 73, a pressure valve 74, and a controlling valve 75; it being seen that the pressure valve is between the valves 73 and 75. This conduit 72 may communicate with the atmosphere or it may lead into the conduit 35, leading to the vacuum pump and provided with a valve 82.

In the embodiment seen in Figures 4, 5, 6, 7, and 8, I have shown a different construction and arrangement of the scraping members.

In this embodiment the inner and outer drums are similar in construction to that already described in reference to Figure 1 and the inner revolving drum is mounted and driven in the same manner.

In this embodiment seen in Figure 4, the driven shaft 44 is intergeared with the sleeve 45 which is connected to the rotatable steam drum 46, and steam is admitted to such drum 46 through the conduit 47, which is provided with a rotary union 48. The exhaust of steam takes place through the pipe 49 which is weighted so that it will always stay in substantially the position seen in Figure 4, and at its upper end it is connected by means of a rotary union 50 with a pipe 51 which also has a rotary union 52.

The steam drum is journalled in the end casing members 53 which are connected with the steam jacketed outer drum 54 in any desired manner. The outer drum 54 is provided with a steam inlet 55 and with an outlet 56.

57 is the cooking and drying chamber which is located between the inner revolving drum and the outer steam jacketed drum, and this chamber is provided with a filling opening 58 having a closure 59, and also a pipe 60 which communicates with a vacuum pump of any desired or conventional character.

In this embodiment, the revolving drum has fixed to it, in spaced relationship, the scraping members 61 which are formed of bars which are deflected to form the cylindrical opening 62 so that the members 61 can be fixed to the inner drum by spot welding, riveting or by fastening devices 63. The oppositely directed arms 64 have their outer ends forming scraping members which are adapted to contact with the inner periphery of the steam jacketed drum 54. Between each pair of scraping members 61, I provide a scraping member 65 which is formed of two bars deflected to form an opening 66 in order to adapt it to fit loosely around the rotatable steam drum 46 and the flanges of these bands at their upper ends are laterally extended to form a bevelled scraping blade 68 which rides on the periphery of the drum 46.

The flanges at the lower end have connected therewith, the weights 69 which tend to retain the scraping blades 68 at the top of the revolving steam drum 46, it being understood that the scraping members 65 are not fixed to the revolving drum but are free to revolve thereon and are guided between the scraping members 61. The scraping members 61 are preferably fixed to the revolving drum 46 in such a manner that their blades 64 are helically arranged thereon, to facilitate the mixing and breaking up of the material which is being treated during the revolution of the revoluble steam drum 46.

Figure 2:
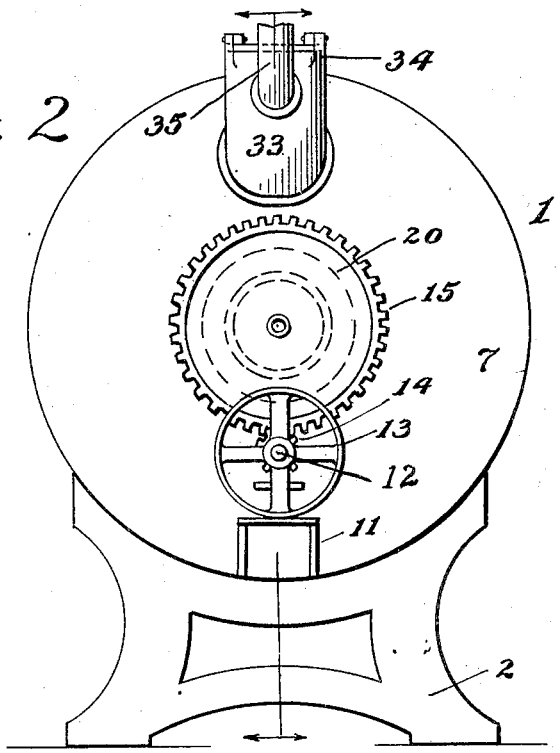
Figure 2 is an end elevation of Figure 1.
Figure 3:
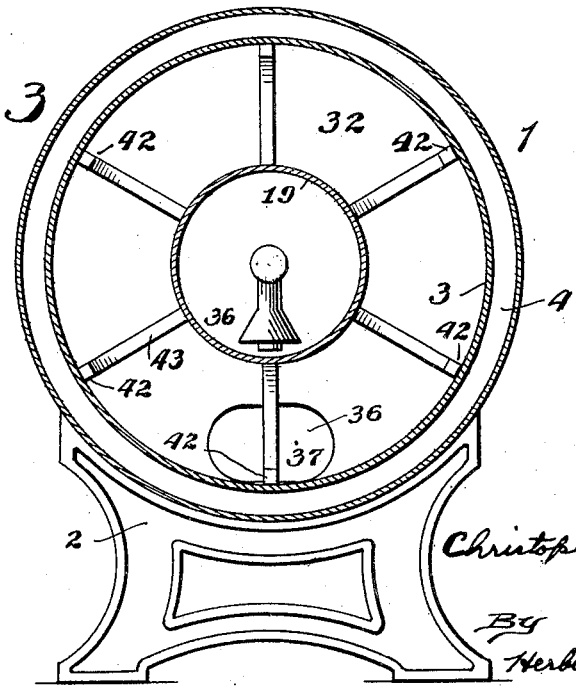
Figure 3 is a section on line 3—3 of Figure 1.

In the operation of the form of my invention in Figures 1, 2, and 3, the material to be treated is introduced through the filling opening 33 and the cover 34 is then closed. The steam is introduced through the conduit 71 into the chamber 32 which contains the material to be treated and this introduction of steam is continued for a desired interval with the steam under a desired pressure. The valve in the conduit 71 is then closed and also the valve 73, and if desired, the valve 75. The driving shaft 12 is then actuated to effect the rotation of the inner drum 19 and the steam is introduced into and through the inner drum 19, the water of condensation being removed through the conduit 27.

During the revolution of the drum, it will be apparent that the scraping members 42 will scrape the inner walls of the outer drum and the stationary scraping members 40 will scrape the walls of the inner revolving drum so that the material being treated will not accumulate on the surfaces of the drums through which the heat from the drum is being radiated.

It will be apparent that the fixed scraping members carried by the inner drum and the loosely mounted members on the revolving drum prevents the accumulation of the material being treated on the heating surfaces with which said scraping members cooperate, so that I am able to materially reduce the time of treatment and I reduce to a minimum the amount of steam which it is necessary to employ.

In the construction seen in Figure 4, similar means are employed to that seen in Figure 1 to introduce steam into the material being treated, it being seen that I provide a valve controlled conduit 76 leading from a source of steam supply and communicating with the chamber 57, said chamber having also leading from it a conduit 77, having a manually controlled valve 78, a pressure reducing valve 79, and a manually controlled valve 80 on the opposite side of the pressure reducing valve 79. This conduit 77 may discharge to any desired point, being illustrated as communicating with the conduit 60, leading to the vacuum pump, and this latter conduit may be provided with a valve 81, if desired.

It will be apparent that in the operation of the construction seen in Figure 4, the same method as that already described may be carried out. The steam may be introduced through the valve controlled conduit 76 into the chamber 57, which receives the material to be treated, and this introduction of steam is continued for a desired interval with the steam under a desired pressure.

The valve in the conduit 76 is then closed and the valves 78 and 80 opened so that the steam pressure may be relieved, if desired. The valve 78 is then closed and the operation is continued as before explained, during the revolution of the inner drum and during such revolution, the blades carried by the inner drum scrape the surface of the outer drum and the loosely mounted blades carried by the inner drum scrape the outer surface of such inner drum so that the surfaces of the heat chamber do not have adhering thereto layers of the material being treated, which tend to insulate the material from the action of the heat radiating through the walls of the drums and derived from the steam pressure.

After the material has been treated so that it is properly cooked and dried, it is discharged through the openings controlled by the gates 70, the construction and arrangement of which may vary according to practice.

The scraping members are preferably bevelled at their drum contacting faces in order to facilitate their scraping or cleaning actions.

It will be apparent from the foregoing that in all of the embodiments herein shown, I prevent the accumulation of the material being treated on the heating surface and thereby prevent the insulating of the heating surfaces by the baking of the material on them. The scraping members also have the function of breaking up and agitating the material as it is being treated and prevent its cooking and drying in a solid mass, which, as it is apparent to those skilled in the art, is difficult to remove from the chamber in which it has been treated.

In my present invention, when the gates are opened, practically all of the material which has been treated will be automatically discharged through the openings controlled by such gates.

The machine is preferably of such height from the floor or ground that trucks can be placed beneath the gate openings.

Having thus described my invention what I claim as new and desire to secure by Letters Patent, is:—

1. In a cooking and drying apparatus, the combination with relatively rotatable concentric steam drums forming between them a chamber to receive the material to be treated, of scraping means contacting with the outer wall of the inner drum and the inner wall of the outer drum to prevent the accumulation of the material on the walls of said chamber.

2. In a cooking and drying apparatus, the combination with an outer stationary steam heated drum, of an inner rotatable steam heated drum concentric with said outer drum, means to rotate said inner drum, means to scrape the outer walls of said inner drum and means to scrape the inner walls of said outer drum.

3. In a cooking and drying apparatus, the combination with an outer stationary steam heated drum, of an inner rotatable steam heated drum, means to rotate said inner drum, and means carried by said inner drum to scrape its outer walls and also the inner walls of said outer drum.

4. In a cooking and drying apparatus, an outer stationary steam jacketed drum, an inner rotatable drum concentric with said outer drum, means to introduce steam into said inner drum, means to remove the water of condensation from said inner drum, said drums forming between them a chamber to receive this material, and means to scrape the inner opposed walls of said chamber.

5. In a cooking and drying apparatus, an inner end and an outer steam heated drum forming between them a chamber to receive the material, scraping members for the inner drum loosely mounted thereon, and means to scrape the inner walls of said outer drum.

6. In a cooking and drying apparatus, an inner end, an outer steam heated drum forming between them a chamber to receive the material, scraping members for the inner drum loosely mounted thereon, and scraping members fixed to said inner drum to scrape the inner walls of said outer drum.

7. In a cooking and drying apparatus relatively rotatably steam heated concentric drums forming between them a chamber for the material to be treated, means to introduce steam into said chamber, and means to scrape the outer wall of said inner drum and the inner wall of said outer drum.

8. In a cooking and drying apparatus relatively rotatably steam heated concentric drums forming between them a chamber for the material to be treated, means to introduce steam into said chamber, means to scrape the outer wall of said inner drum and the inner wall of said outer drum, and a valve controlled suction pipe communicating with said chamber.

CHRISTOPHER OFFENHAUSER.